3,577,408
TETRAHYDRO-2-OXOFURAN PENICILLINS
Harvey E. Alburn, West Chester, William Dvonch, Radnor, and Stephan Sallay, Wynnewood, Pa., assignors to American Home Products Corporation, New York, N.Y.
No Drawing. Filed Oct. 15, 1968, Ser. No. 767,822
Int. Cl. C01d 99/16
U.S. Cl. 260—239.1
3 Claims

ABSTRACT OF THE DISCLOSURE 6-(tetrahydro - 2 - oxofuran - 3 - carboxamido)penicillanic acids which may be substituted in the 3 and 5 positions, or the opened ring forms of these penicillins are produced, having antibiotic activity.

---

This invention relates to the preparation of novel penicillins and more particularly to new and useful tetrahydrofurancarboxamido penicillanic acids.

The compounds of the invention may be illustrated by the following structural formula:

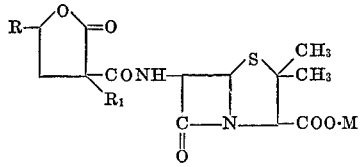

In the above formula, the symbol R is intended to represent either hydrogen, a lower alkyl of 1 to 3 carbon atoms, an aryl radical, but preferably phenyl, an aralkyl, preferably benzyl, or an alicyclic radical such as cyclohexyl. The symbol $R_1$ is intended to represent either hydrogen or a lower alkyl of 1 to 2 carbon atoms. The symbol M represents either hydrogen, ammonium, an alkali or alkaline earth cation.

While the compounds are isolable in the γ-lactone form as indicated above, it is also contemplated that this ring may be opened under mildly alkaline hydrolysis conditions in which case the penicillins would have the following configuration:

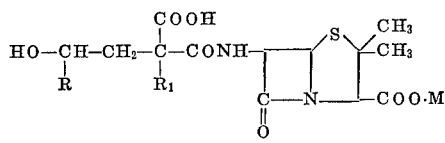

In the above opened-ring structure R, $R_1$, and M have the previously assigned meanings.

The compounds may be prepared in accordance with the following specific reaction scheme, starting first with the preparation of the γ-lactones.

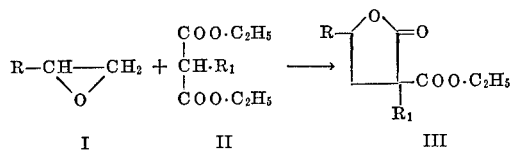

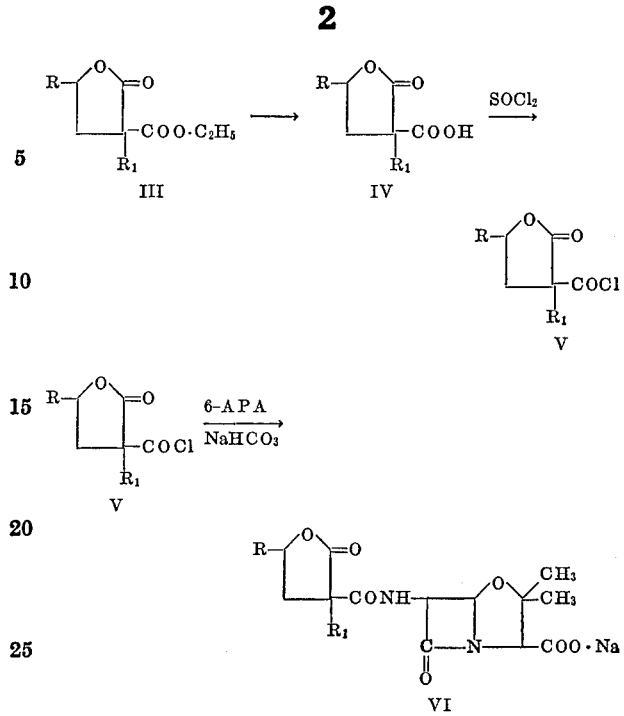

In the flow scheme shown above, it will be understood that R and $R_1$ have the previously assigned meanings.

To carry out the procedure as indicated, the lactone is initially prepared by the reaction of a selected diethylmalonate II through the medium of a magnesium salt with the desired epoxy compound of Formula I under known conditions, the compound formed being designated as III. This lactone ester is then hydrolyzed to the acid form, indicated as compound IV.

The lactone (IV) is reacted with thionyl chloride in either under refluxing conditions forming the acid chloride V. The latter, in an ether solvent, is reacted under ice-cold conditions with 6-aminopenicillanic acid and a base substance, such as triethylamine. The penicillin acid may be isolated as such but preferably a nontoxic salt is formed, prepared by known procedures.

Compounds prepared by the process outlined above, starting with such compounds of Formula I as 1,2-epoxypropane, 1,2-epoxybutane, 1,2-epoxypentane, epoxyethylbenzene, 2,3-epoxypropylbenzene, epoxyethylcyclohexane, and malonic acid, diethyl ester (II) are 6-(5-methyltetrahydro - 2 - oxofuran - 3 - carboxamindo)penicillanic acid, 6-(5-ethyltetrahydro - 2 - oxofuran-3-carboxamido)penicillanic acid, 6-(5-propyl-tetrahydro - 2 - oxofuran-3-carboxamido)penicillanic acid, 6-(5-phenyl-tetrahydro-2-oxofuran-3-carboxamido)penicillanic acid, 6-(5-benzyltetrahydro - 2 - oxofuran - 3 - carboxamido)penicillanic acid, 6-(5-cyclohexyl - tetrahydro - 2 - oxofuran-3-carboxamido)penicillanic acid, respectively.

Where one starts with 1,2-epoxybutane and methylmalonic acid, diethyl ester, the reaction produces (2-hydroxybutyl) methylmalonic acid-γ-lactone, ethyl ester and the final penicillin product is 6-(5-ethyl-3-methyltetrahydro - 2 - oxofuran - 3 - carboxamido)penicillanic acid. With this illustration, and using any of the epoxides mentioned, the corresponding 3-methyl or ethyl-tetrahydro-2-oxofuran-3-carboxamido penicillanic acids are produced.

The following examples are selected to illustrate the various steps of the total process in greater detail. It should be understood that the metric system is used and temperatures as given are, of course, in degrees centigrade.

EXAMPLE 1

Preparation of (2-hydroxybutyl)malonic acid-γ-lactone 146 g. (6 moles) of magnesium was covered with a mixture of 400 ml. of benzene, 40 ml. of absolute ethanol and 12.0 g. diethylmalonate. After the reaction was started, a mixture of 1117 g. of diethylmalonate and 350 ml. of absolute ethanol was slowly added. The reaction mixture was refluxed until the magnesium went into solution.

Then 432 g. (6 moles) of 1,2-epoxybutane in 1000 ml. of dry ether was slowly added to the reaction mixture between 30–45° (internal temperature). Addition took about 30 minutes. After the addition of the epoxide, the reaction mixture was heated for another three hours.

Then the reaction mixture was cooled with ice and acidified with ice-cold diluted $H_2SO_4$. The organic layer was separated, washed with water and $NaHCO_3$ solution. The crude product was distilled and the main fraction boiled at 85–93°/.005 mm., to yield the title compound as the ethyl ester.

596 g. of the lactone ester was dissolved in a warm solution of 358 g. KOH in 3200 ml. methanol. As exothermic reaction took place. The mixture stood at room temperature overnight and was evaporated to dryness. The solid residue (K salt) was dissolved in 1000 ml. of water and extracted with ether (the ether extract was discarded). The water extract was acidified below room temperature with 20% HCl. The acidified solution was then extracted with ether which left back 506 g. colorless oil of the lactone acid. Analysis and identification of the lactone acid was carried out by transforming it into the dibenzyl-ethylene-di-amine salt in ether. The solid melted at 113–114°.

Calculated for $C_{30}H_{40}O_8N_2$ (percent): C, 64.73; H, 7.24; N, 5.03. Found (percent): C, 65.08; H, 7.51; N, 4.93.

EXAMPLE 2

6-(5-ethyl-tetrahydro-2-oxofuran-3-carboxamido) pencillanic acid, sodium salt 2-hydroxybutyl)malonic acid-γ-lactone (0.010 mole) in 50 ml. ether was treated with 1.69 g. thionyl chloride (0.72 ml., 0.010 mole) a trace of dimethylformamide (1 drop) at reflux temperature for 3 hours. The reaction mixture was concentrated to an oil with the addition of benzene to remove excess thionyl chloride and then dissolved in 30 ml. ether. The solution of the acid chloride was added to stirred ice-cold solution of 2.16 g., 6-aminopenicillanic acid (0.010 mole) dissolved in 50 ml. methylene chloride and triethylamine (1.70 ml., 0.0120 mole), and the reaction mixture was stirred for 30 minutes at 5°. A 100 ml. portion of water was added, and the aqueous phase was separated. The organic phase was extracted with 50 ml., more of water. The aqueous phase was adjusted from pH 9.7 to 2.0 with 6 N hydrochloric acid and extracted with methyl isobutyl ketone (3× 60 ml.) An equal volume of water was added to the organic phase, and the pH was adjusted to 6.0 with solid sodium bicarbonate. The aqueous phase was separated, concentrated, and freeze-dried to yield the title product.

Pencillin compounds of the invention are submitted to microbiological evaluation using standard techniques, an agar serial dilution screening test being preferred. The antibacterial activity of the test compound is thus determined and compared with such standards as benzylpenicillin, streptomycin or tetracycline.

The compound of Example 2, when submitted to such a test procedure showed activity against the following organisms in terms of the minimum inhibitory concentration (MIC) expressed in μg./ml. needed to completely inhibit them.

| Oragnism: | MIC, μg./ml. |
|---|---|
| Bacillus subtilis ATCC 6633 | 31.3 |
| Bordetella bronchiseptica ATCC 4617 | 250 |
| Enterobactor aerogenes ATCC 884 | 62.5 |
| Escherichia coli ATCC 6880 | 125 |
| Escherichia intermedia ATCC 65–1 | 250 |
| Herellea sp. ATCC 9955 | 62.5 |
| Proteus vulgaris ATCC 9920 | 125 |
| Salmonella paratyphi ATCC 11737 | 125 |
| Staphylococcus aureus ATCC 6538P | 15.6 |
| Staphylococcus aureus Smith | 15.6 |

It should be noted that the compounds of the invention are useful as antibacterial agents either in the oxofurane (lactone) form or in the hydrolyzed open-ring form and the latter are therefore contemplated as equivalents in antibacterial activity whether used alone or in combination with the lactone form in preparing compositions for antibacterial use.

Antibacterial compositions may be used in comparative laboratory experimental evaluations as drugs, for industrial uses or, in general, in compositions where antibacterial activity may be desired, for example, in detergent compositions, soaps, or in cosmetic preparations for topical application. In composition form, one or more active penicillins are used as such without dilution, or combined with a carrier or inert extender. In solid form, compositions for oral ingestion, for instance, could comprise such carriers as lactose or talc. For liquid forms, one may use aqueous or oleaginous vehicles as carriers. If an aqueous solution is desired, a water-soluble salt of the active ingredient would be preferred, particularly for the preparation of parenteral compositions for use in warm-blooded animals.

The invention claimed is:

1. A compound having the formula:

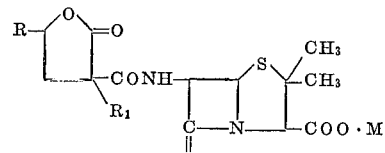

wherein R is a member selected from the group consisting of hydrogen, lower alkyl of 1 to 3 carbon atoms, phenyl, benzyl, or cyclohexyl; $R_1$ is a member of the group consisting of hydrogen and lower alkyl of 1 to 2 carbon atoms; while M stands for a member of the group consisting of hydrogen, ammonium, an alkali or alkaline earth metal cation.

2. A compound of claim 1; in which R is a lower alkyl of 1 to 3 carbon atoms; $R_1$ is hydrogen; and M is an alkali metal cation.

3. 6-(5-ethyl-tetrahydro-2 - oxofuran - 3-carboxamido) penicillanic acid and the nontoxic salts thereof.

References Cited

UNITED STATES PATENTS 3,222,360  12/1965  Fried _____ 260—239.1

NICHOLAS S. RIZZO, Primary Examiner

U.S. Cl. X.R.

424—217